(No Model.) 3 Sheets—Sheet 2.

H. R. WOLFE.
GRAIN DRILL.

No. 322,669. Patented July 21, 1885.

Attest
Carl Spengel
E. W. Rector

Inventor
Harvey R. Wolfe
by Steinsbeck his Atty's (No Model.) 3 Sheets—Sheet 3.
H. R. WOLFE.
GRAIN DRILL.
No. 322,669. Patented July 21, 1885.
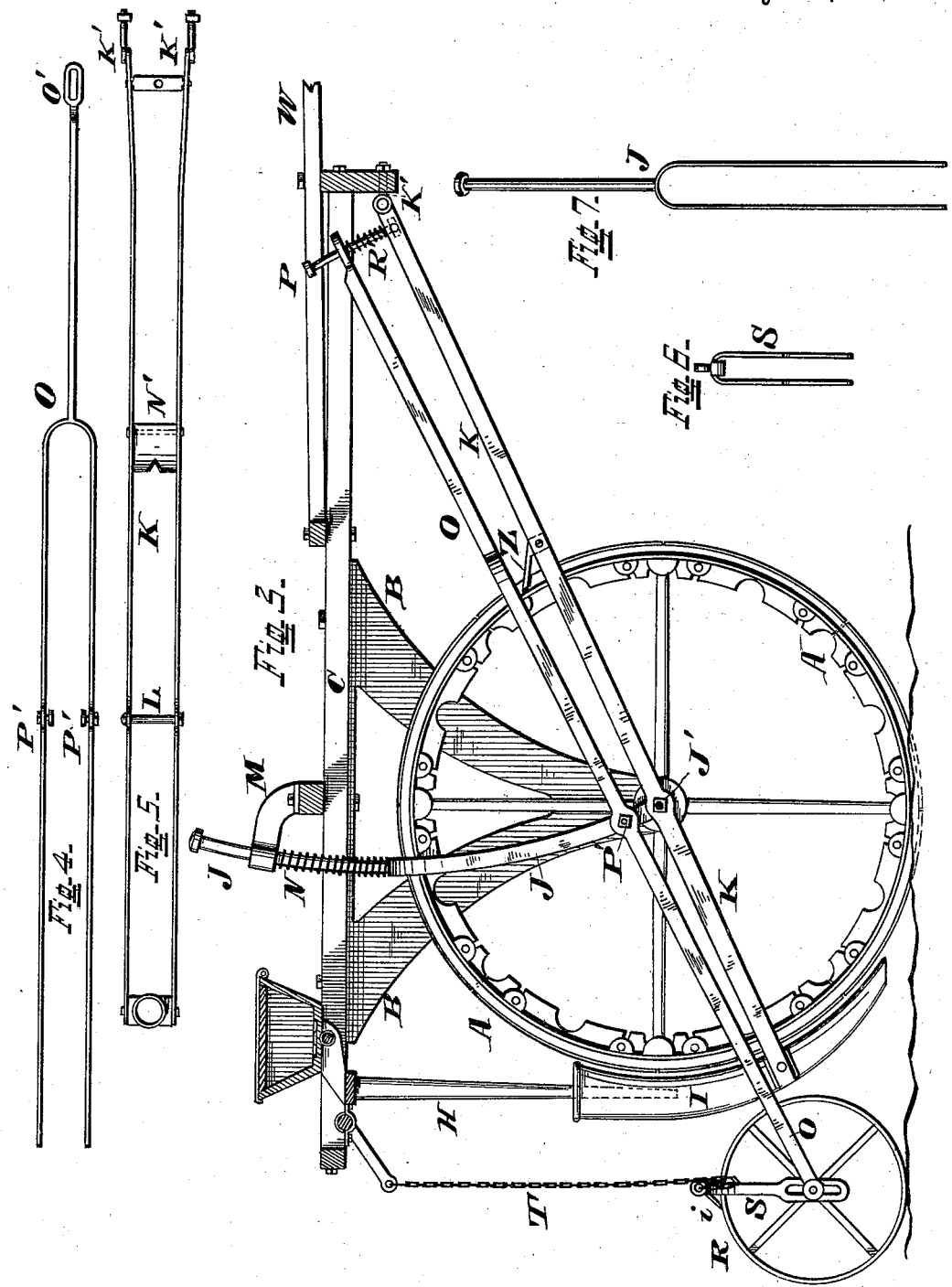
Attest
Carl Spengel
E. W. Rector
Inventor
Harvey R. Wolfe
by Stem & Beck his Att'ys.

UNITED STATES PATENT OFFICE.

HARVEY R. WOLFE, OF LOUISVILLE, KENTUCKY, ASSIGNOR TO BRENNAN & CO. SOUTH WESTERN AGRICULTURAL WORKS, AND CHARLES A. WOLFE, BOTH OF SAME PLACE.

GRAIN-DRILL.

SPECIFICATION forming part of Letters Patent No. 322,669, dated July 21, 1885.

Application filed January 30, 1885. (No model.)

*To all whom it may concern:*

Be it known that I, HARVEY R. WOLFE, a citizen of the United States, residing at Louisville, in the county of Jefferson and State of Kentucky, have invented certain new and useful Improvements in Grain-Drills, of which the following is a full, clear, and exact description, reference being had to the accompanying drawings, forming a part of this specification.

My invention relates to grain-drills in which cutter-wheels are substituted for shoes or shovels for forming furrows for the grain; and it consists in several novel improvements—first, in the use of adjustable cutter-wheels for forming the furrows in which the grain is to be deposited; second, pressure-wheels which cover the grain and roll the ground after the drill; third, the novel arrangement of the drill-frame and parts, so as to balance the frame and avoid the pressure on the tongue and draft-animals' necks.

Figure 1:
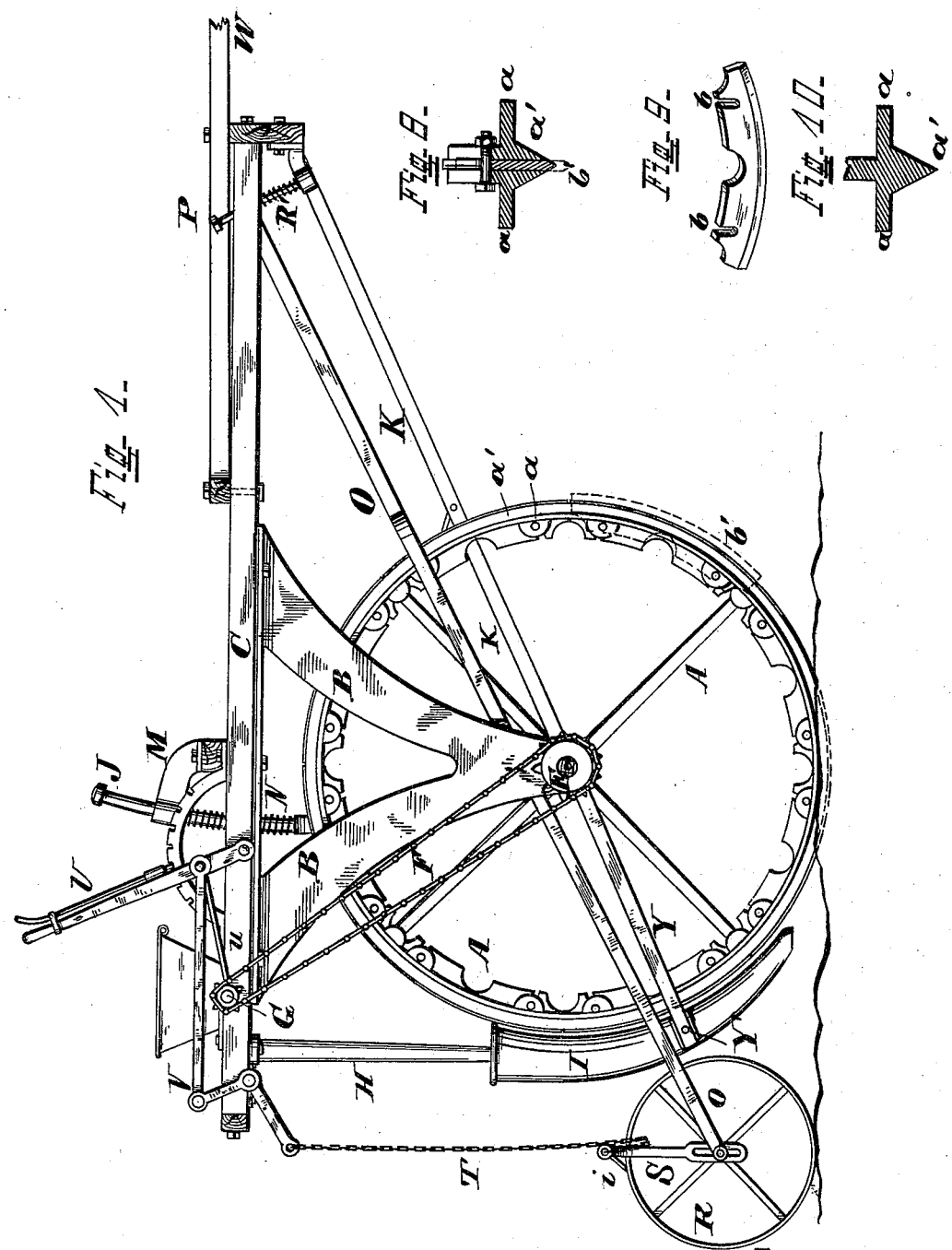
Figure 2:
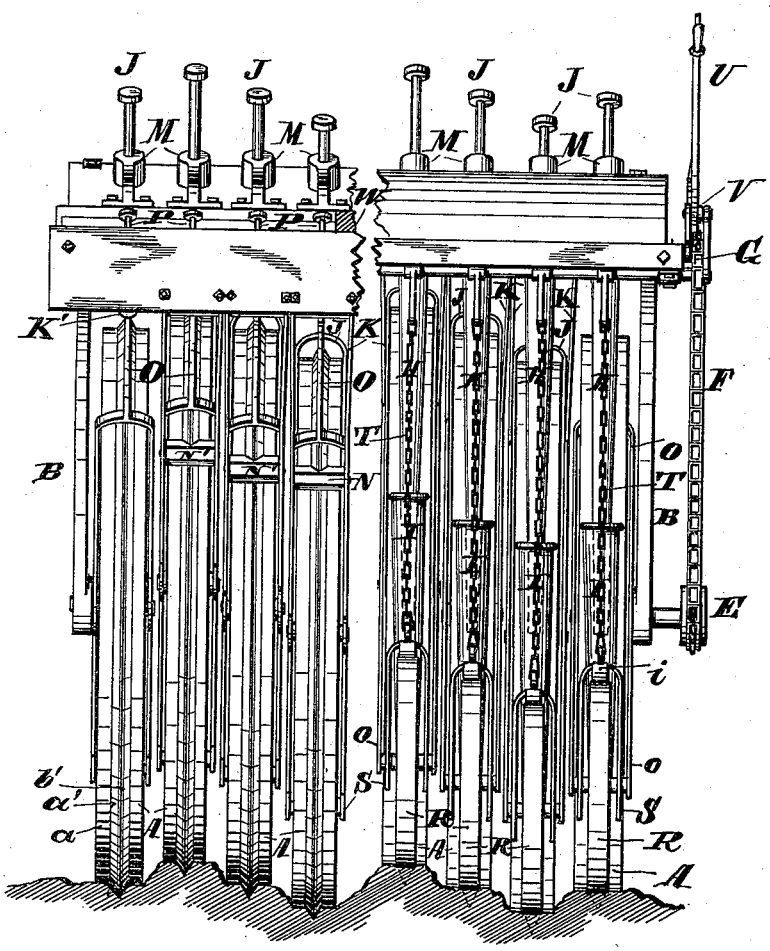

In the accompanying drawings, Figure 1 is a side elevation of a grain-drill, showing the frame, outer cutter-wheel, brackets, and pressure-wheel. Fig. 2 shows a front and rear elevation. Left of the broken line is a front view and the right a rear view. Fig. 3 is a sectional side elevation showing the frame and attachments for the inner wheels. Fig. 4 is a top plan view of the yoke carrying the pressure-wheel. Fig. 5 is a plan view of the frame K attached to the cutter-wheel and carrying the spout. Fig. 6 represents the short slotted yoke for lifting and adjusting the pressure-wheel. Fig. 7 is a front view of the yoke J without the spring. Fig. 8 is a sectional view of the rim of the cutter-wheel, showing the parts bolted together. Fig. 9 is a segment of the adjustable cutter. Fig. 10 is a sectional view of the rim of the cutter-wheel when used as furrow-opener and gage without the steel cutter.

The same letters of reference are used to indicate identical parts in all the figures.

In the ordinary construction of grain-drills the grain is conducted to the ground by a series of hoes or shoes or hollow iron tubes whose points make a furrow in which the grain is dropped. These hoes or shoes are liable to become clogged by the stubble or trash on the ground, and they leave the ground more or less uneven and lumpy. They necessarily make the draft of the machine heavy, as their points are dragged through the ground to make furrows. It is difficult to gage the depth of the furrow, and when springs are used to press the hoes into the ground to make a deep furrow the draft is made very heavy and exerts a greater or less downward pressure on the horses' necks. These objections, as well as some others, are overcome by my improvements by making the furrow with a flanged wheel provided with a V-shaped furrow-opener on its periphery or edge, and an adjustable cutter by which the furrow is made any desired depth, and which cuts through the stubble or stalks instead of gathering them up. A spout is provided in the rear of the cutter-wheel to convey the grain to the furrow, and in the rear of the spout is a pressure-wheel which covers the grain and smooths and levels the ground. These wheels are connected to the frame, and so adjusted by springs as to balance the drill and prevent the tongue from bearing down upon the draft-animals' necks or flying up when the pressure for covering the grain is removed—that is, when the drill is not in operation and the pressure-wheels elevated.

A is a cutter-wheel of any convenient size, the rim of which is constructed with flanges *a a*, and a V-shaped edge or furrow-opener, *a'*, Figs. 8 and 10. The flanges *a a* act as rollers, breaking the clods or lumps, and remain on the surface of the ground, both supporting the wheel and acting as gages for regulating the depth of the furrow, while the V-shaped edge or periphery opens a furrow for the grain. The rim of the wheel A may be made solid, as shown in Fig. 10, or it may be made in two sections, bolted together, as in Fig. 8, or with a longitudinal opening. Between these sections are bolted a number of segmental cutters made of steel or chilled iron. (Fig. 9.) These cutters are made with slots *b*, so that they may be adjusted to extend any desirable distance beyond the periphery of the wheel proper, as shown by the dotted lines at b', Fig. 1. This cutter assists in opening the furrow in hard ground, and cuts through all stalks or trash on the ground, thus preventing clogging, and being adjustable beyond the edge or periphery of the wheel the depth of the furrow may be regulated according to the width of the cutter. The flanges a a support the wheel on the surface of the ground. On a two-horse drill there are usually eight or ten of these wheels, the number of course being varied to suit the circumstances. The two outer wheels, A, (shown in Figs. 1 and 2,) are pinioned on axles or studs x, Fig. 2. These studs are attached to brackets B B, the upper ends of which are bolted to the frame C, and are the principal supports of the frame. D is the hopper, in which any appropriate form of seeding mechanism is used. On the outer sides of one or both of the outer wheels, A A, is a sprocket-wheel, E, which carries the chain-gear F, working over the sprocket-wheel G, which operates the seeding mechanism in or below the hopper.

H is an ordinary tube, usually made of rubber, which conveys the grain from the seed-cups to the spout, by which it is carried down to the ground and deposited in the furrow immediately behind the cutter-wheel or furrow-opener A. The two outer spouts, I, following the outer wheels, are supported by a frame or yoke, Y, Fig. 1, the rear end of which is bolted fast to the spout I at y', Fig. 1, the forward end being fixed to the stud x. (Shown in Fig. 2.) All except the outer wheels are attached to the frame of the drill by two yokes. (Best shown in Fig. 3.)

J is a yoke, the two arms of which are united at their lower ends by a pin or bolt, J', which acts as the axle of the wheels A. The upper end of this yoke is attached to the frame C by the bracket M, the yoke J passing loosely through the bracket, free to move up and down. On this yoke, below the bracket M, is a strong spring, arranged to press downward upon the shoulders of the yoke J and the wheel A, thus permitting all the inner wheels to move up or down, following any inequalities of the ground. Of course the upward pressure of these springs upon the brackets M assists in supporting the frame C and lightens the weight on the outer wheels and brackets B B; indeed, they substantially distribute the weight among all the wheels. In addition to the yokes J each inner wheel is provided with a yoke, K, the forward end of which is hinged to the frame, as shown at K', and at a point between its ends it is pivoted to or on the axle J'. These two yokes attach the wheels to the frame and leave them free to move up or down. The yokes K extend back of the wheels A, and to their rear ends are firmly bolted the spouts I. These spouts, therefore, move up or down with the yokes K and wheels A and maintain a proper distance above the furrow, and immediately behind each wheel Z is a scraper, attached to each yoke or frame K, for cleaning the wheels A.

O O are yokes pivoted to the yokes J at P'. Their forward ends are slotted and fit over pins P, attached either to the frame or the yokes K. On the pin P, between the yokes O and the frame of the drill, are springs R', arranged to produce an upward pressure on the forward end of the yokes O, and consequently a downward pressure at their rear ends. The rear ends of the yokes O are attached to small slotted yokes S, which carry the pressure-wheels R, a pressure-wheel being provided for each cutter-wheel. The spring R' produces a constant downward pressure on the yoke S and wheel R. The yoke S is provided with slots for adjusting the wheels R to vary the pressure on the ground. i is a scraper for cleaning the pressure-wheel R. The wheels R follow the wheels A and spouts I, and cover the grain and smooth the ground, making it in good condition for the reaper.

To the yokes S are attached chains T, lifted by a lever, U. Any convenient form of lever may be used, the object being to lift the pressure-wheels to facilitate turning the drill, or when it is not in operation. This lever is also connected by the rod u with the sprocket-wheel G, so as to throw the seeding mechanism out of gear by the same motion that lifts the pressure-wheels.

W is the tongue.

Having thus fully described my invention, I claim—

1. In a grain-drill, a series or gang of wheels for rolling the ground and opening furrows for the grain, followed by a corresponding series of grain-spouts arranged to automatically move up or down with the wheels, in combination with an independent series of yokes, carrying covering or smoothing wheels held in line with the grain-spouts, substantially as described.

2. In a grain-drill, a series of wheels, A, with a V-shaped edge or rim for cutting a furrow in the ground, and lateral flanges for supporting the wheels on the ground and crushing the clods, in combination with a series of grain-spouts arranged to be automatically adjusted up or down with the wheels A, and spring devices operating to hold the said wheels and spouts in a normal position, substantially as described.

3. In a grain-drill, a series of wheels, A, constructed in two parts and held together by bolts, having adjustable segmental cutters clamped between the parts of the wheel, in combination with a series of grain-spouts and pressure-wheels arranged in line with the wheels A, substantially as described.

4. In a grain-drill, a series of wheels for rolling the ground and opening furrows for the grain, in combination with a series of independent hangers or yokes, K, hinged to the frame at their forward ends, and carrying the pivots or axles of the wheels, and spring devices for maintaining said yoke in a normal position, but permitting a vertical yielding movement of the same, substantially as described.

5. In a grain-drill, a series of wheels provided with cutting-edges for opening furrows, in combination with a corresponding series of yokes hinged to the frame at their forward ends and connected between their ends to the axles of the cutting-wheels, and carrying at their rear ends a series of spouts, and spring devices for maintaining said yoke in a normal position, but permitting a vertical yielding movement of the same, substanially as described.

6. The combination, in a grain-drill, of a rigid main or supporting frame, a series of wheels for rolling the ground and opening the furrows and attached to the frame of the drill by independent yokes or hangers, yokes J, each having its bifurcated portion embracing its particular wheel to receive the ends of the wheel-axle, as described, the upper portion of each yoke playing in a bearing located on the frame independent of the bearings of the other yokes, and carrying a spring, N, arranged to exert a downward pressure on the wheels or an upward or supporting pressure on said frame, substantially as set forth.

7. In combination with the wheels A and the pressure-wheels R, the yokes O, pivoted to the yokes J, and pressed upward at their forward ends by springs, substantially as and for the purpose specified.

8. The yokes O, carrying the pressure-wheels R, in combination with the spiral springs R', substantially as and for the purpose specified.

9. The combination, in a grain-drill, of a vertical yoke, S, suspended from the main frame of the machine, vertically slotted at its lower portions, as described, and supported relative to the drill, a pressure-wheel, R, having its journal-bearing in said slots, substantially as set forth.

10. The combination, in a grain-drill, of a main or supporting frame, a series of inclined yokes or hangers pivoted at the front of said frame and extendeding rearward, as described, a vertical yoke, S, located adjacent to the end of each of said frames and suspended from the main frame and provided with vertical slots at its lower portions, a pressure-wheel, R, having its journal ends adjustable in said slots and bearing in the ends of the inclined frame, substantially as set forth.

11. The combination, in a grain-drill, of spring-supported wheels constructed to open the furrows in the ground, drills located in the rear of said wheels, spring-supported furrow-covering pressure-wheels arranged in the rear of said drills, and means for vertically adjusting said furrow-covering wheels independent of the furrow-opening wheels, substantially as set forth.

HARVEY R. WOLFE.

Witnesses:
L. W. HOMIRE,
W. B. MASON.